UNITED STATES PATENT OFFICE.

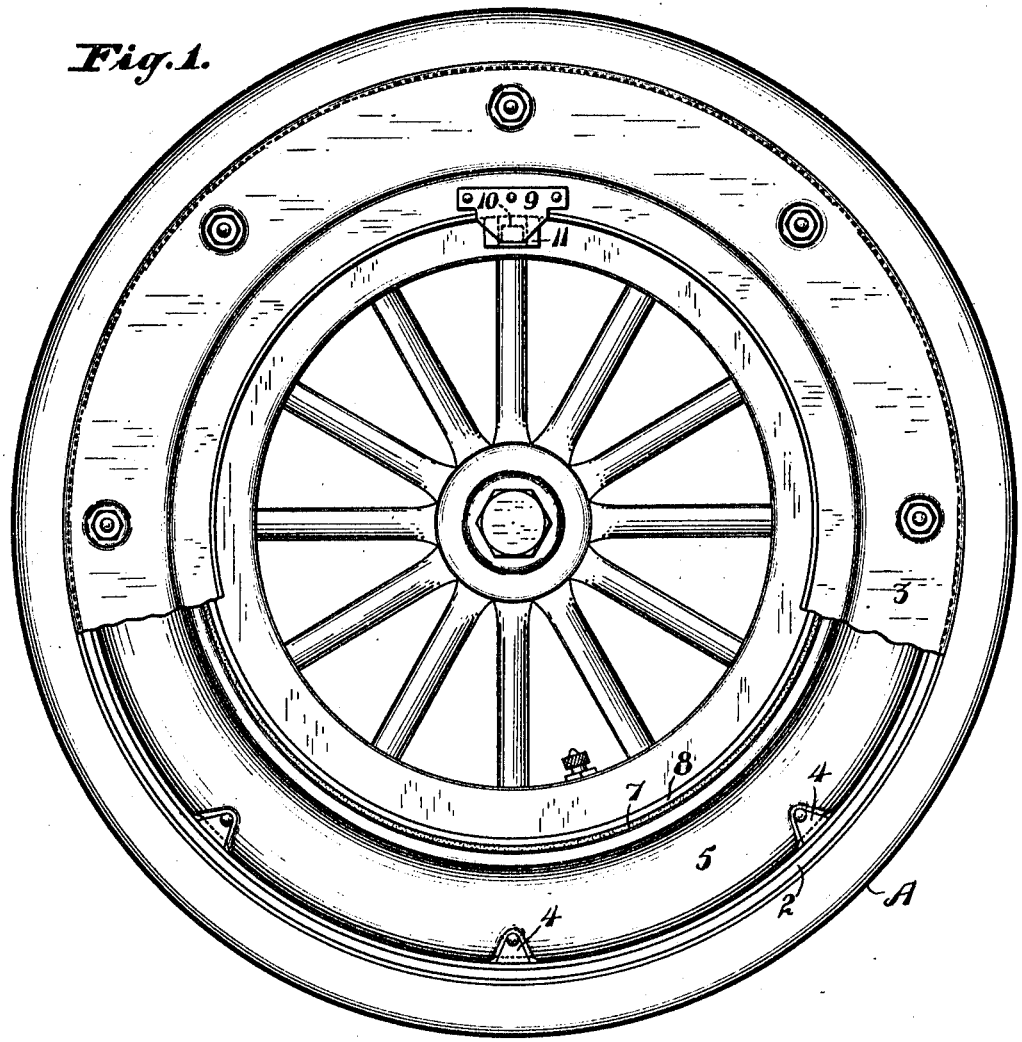
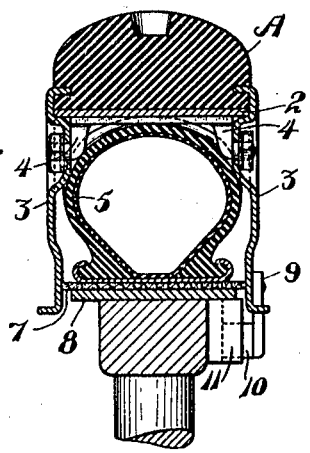

PATRICK FRANCIS DUNDON, OF SAN FRANCISCO, CALIFORNIA.

VEHICLE-WHEEL ATTACHMENT.

1,316,944.     Specification of Letters Patent.     Patented Sept. 23, 1919.

Application filed June 17, 1918. Serial No. 240,327.

*To all whom it may concern:*

Be it known that I, PATRICK FRANCIS DUNDON, a citizen of the United States, residing at the city and county of San Francisco and State of California, have invented new and useful Improvements in Vehicle-Wheel Attachments, of which the following is a specification.

This invention relates to improvements in automobile and like wheels, and particularly pertains to an attachment by which the pneumatic cushion tires of vehicle wheels may be concealed and protected.

It consists in a wheel structure in which a pneumatic standard rubber air tube and fabric casing is contained in a clencher rim, concealed and protected and thoroughly reinforced against excessive air pressure and protected from road contact, puncture, stone bruise, or increase of pressure from road friction.

Referring to the accompanying drawings for a more complete explanation of this invention—

Figure 1 is a side view of the wheel showing one side plate as partially removed.

Fig. 2 is a transverse section through the tire and other parts.

A is a solid outer tire or tread carried on a flat metal band 2. The diameter of the band is such that the pneumatic cushion encircled thereby will snugly fit therein when properly inflated and will therefore be rigidly bound so that local shock and load delivered to the surface of the tire at any one point will be transferred around the pneumatic cushion and will therefore be absorbed by the entire circumference thereof. This band is borne upon shoulders upon the exterior of annular plates 3 which are located one upon each side of the wheel and preserve the band 2 in a true circle at all times. The sectional formation of these plates is shown in Fig. 2, where it will be seen that they possess annular inturned flanges adapted to register with grooves in the opposite sides of the tire A. The plates also are countersunk at equal intervals along the sides for a purpose which will be hereinafter set forth. The metal band 2 will be held in fixed relation to the tire A and will unite with the flanges of the plates to securely grip the tire in its position therearound. The inner circumferential edges of the plates 3 are formed with slightly outturned flanges adjacent to which parallel side portions are formed to coöperate with packing means by which dirt and water may be excluded from the air cushion and stiffen the structure. These side plates are firmly held in place by metal clips 4 which are fastened to the inner side of the tire or tread band and have threaded ends which project through the side plates. Nuts are screwed upon these ends and have their bearings in sunken recesses in the side plates to avoid outward projection. As clearly shown in Fig. 2, the clips extend laterally across the tire band 2 and have lugs at the ends thereof which project inwardly against the circumference of pneumatic tire 5. Due to the fact that the inner circumference of the tire band 2 agrees with the outer circumference of the air cushion, it therefore necessitates that the lateral portions of the clips will be embedded within the casing of the air cushion.

Inclosed between the plates 3 and circumscribed by the band 2 is a pneumatic tire 5. This tire is mounted on a clencher rim which in turn rests on a flexible elastic band 7 which acts as a gasket. The band 7 is fastened upon the wheel tire projecting over the edge of the wheel band 8 to have contact with the inner surface of the side plates 3 and making a water-tight and dust-tight joint to prevent water or dust from entering the annular space containing the air tube and casing, and the nuts which fasten the side plates are counterbored and contain fabric gaskets. The outer flanges of the side plates which grip the lips of the tires serve an equal purpose, thereby making the tube and casing chamber perfectly water-tight and dust-tight. In order to render the casing structure more dust and water-proof, suitable gaskets are placed around the threaded ends of the clips 4 and beneath the nuts upon these members to entirely pack the openings through which the threaded portions of the clips extend. It will thus be seen that the combined sealing action of these gaskets and the annular gaskets 7 will act to entirely inclose the tire and protect it.

It will be obvious that the tube and casing, being firmly held in the clencher rim and having its bearing upon the circumference of the wheels and being confined in the annular chamber described, when the tube is inflated, the full force of the pressure is exerted against the suspended band 2 upon which the tread tire has its base, and consequently as the same force sustains the standard pneumatic tire, it will also sustain this band. It will also be obvious that in consequence of having substantial reinforcement on the four sides of the casing and tube that a much lower pressure in the tube, when inflated, will be sufficient, for the reason that the walls of the casing being firmly sustained they cannot expand beyond that circle, and for the same reason a very considerable overload cannot produce a bursting effect or blow-out. It will be also equally obvious that at all times the wheel has an air cushion on the full lower half of its circumference and insures a higher degree of resiliency than can be obtained from the standard pneumatic tires for the very plain reason that such tires having only the strength of the fabric which is elastic, the pressure caused by the weight causes some degree of compression at the point of contact with the road and the cushion is confined to that area alone, because, in consequence of the flexibility of the fabric structure without any other support, it yields and expands at each side of the point of compression, and such action being continuous, rapidly weakens the fabric for it cannot be disputed that it is constantly exercising a tensile strain upon the structure of the casing.

In the structure here presented, the annular chamber is of precisely right area to permit the casing to be expanded by the air pressure to its natural size only, and in consequence there will be actually no strain upon the fabric structure nor upon the tubes and there is complete absence of friction, means are further provided for eliminating strain from the fabric structure and the outer tubes by affording positive engagement between the armored structure and the felly of the wheel. This means consists of a plate 9 secured to the outer side of one of the side plates and extending inwardly to overhang the inner circumference. This plate carries an integral lug 10 upon its inner face, this lug is adapted to register with a locking member 11 secured to the said face of the wheel felly. The side plate is formed with a radially extending slot in which the lug is seated. This slot and side plate are formed with tapering sides which diverge toward the felly, there is a certain amount of play between the tapering side of the slot and lugs so that the armor will be capable of yielding when the tire is compressed during the various intervals in the rotation of the wheel.

In applying the present invention to a vehicle wheel, the gasket 7 is first placed over a wheel tire 8, after which the rim of a pneumatic cushion is disposed over the gasket. It will be understood that the pneumatic cushion may be formed as shown in Fig. 2 of the drawings, or that any other resilient annular member might be positioned upon the rim. The outer band 2 may then be disposed around this cushion member. In some instances it may be found convenient to previously assemble the band 2 with the side plates 2 and 3 and the outer tread A. If this has been done it will be necessary to remove one of the side plates in order to place the structure around the cushion member. After the band 2 has been thus disposed in relation to the cushion member, the side plate previously removed may be bolted into position by the nuts and clips 4. In disposing the structure around the pneumatic cushion it will of course be necessary to bring the members 10 and 11 into register upon the opposite sides of the wheels. The pneumatic cushion may then be inflated until its outer circumference agrees with the inner circumference of the band 2. The wheel and its attachment will then be in condition for use and when pressure is exerted upon the tread portion A, this pressure will be distributed, as previously described, to the entire band and will cause the complete circumference of the pneumatic or resilient cushion to receive the shock of the impact.

While I have shown one form of my invention it will be understood that various changes in the combination, construction and arrangement of parts may be made by those skilled in the art without departing from the spirit of the present invention as claimed.

Having thus described my invention, what I claim and desire to secure by Letters Patent is—

1. In combination with a wheel and a tire therearound, a metal band encircling and seated upon the tire, pairs of inwardly extending clips carried by the band and disposed on opposite sides of the tire and engaged therewith, said clips having right angular threaded outwardly extending ends integral therewith, a pair of side plates on opposite side of the tire tread, a solid outer tire seated on the metal band, said side plates having annular inwardly extending portions forming shoulders upon which latter the metal band sides seat, said inwardly extending portions also engaging the respective opposite sides of the tire at points beyond the clips and seating flat against the outer sides of the clips, and nuts on the threaded ends of the clips to hold said side plates on and against the clips, said nuts being arranged within the depressions provided by said inwardly extending portions of the side plates.

2. In combination with a wheel and a tire thereon, a metal band encircling the tire and seated thereon, a pair of side plates arranged on opposite sides of the tire and having portions engaging the inner circumference of the band and also having annular inwardly extending shoulders formed by depressing the plates between their inner and outer edges, said shoulders engaging the tire along the side portions of the tread and being spaced from the metal band, and means carried by the band and arranged in said space between the band and shoulders and being rigidly secured to the side plates so as to hold the latter in their said relation to the band.

In testimony whereof I have hereunto set my hand in the presence of two subscribing witnesses.

PATRICK FRANCIS DUNDON.

Witnesses:
JOHN H. HERRING,
THOS. CASTBERG.

Copies of this patent may be obtained for five cents each, by addressing the "Commissioner of Patents, Washington, D. C."